(12) United States Patent
Häfele et al.

(10) Patent No.: US 11,345,208 B2
(45) Date of Patent: May 31, 2022

(54) AXLE ASSEMBLY FOR A HEAVY-DUTY VEHICLE AND HEAVY DUTY-VEHICLE HAVING AT LEAST ONE SUCH AXLE ASSEMBLY

(71) Applicant: GOLDHOFER AG, Memmingen (DE)

(72) Inventors: Horst Häfele, Babenhausen (DE); Felix Merkel, Memmingen (DE)

(73) Assignee: GOLDHOFER AG, Memmingen (DE)

( * ) Notice: Subject to any disclaimer, the term of this patent is extended or adjusted under 35 U.S.C. 154(b) by 35 days.

(21) Appl. No.: 16/808,752

(22) Filed: Mar. 4, 2020

(65) Prior Publication Data
US 2020/0282792 A1    Sep. 10, 2020

(30) Foreign Application Priority Data
Mar. 6, 2019   (DE) ...................... 10 2019 203 018.1

(51) Int. Cl.
*B60G 17/04* (2006.01)
*B60G 17/056* (2006.01)

(52) U.S. Cl.
CPC ..... *B60G 17/0416* (2013.01); *B60G 17/0565* (2013.01); *B60G 2206/0112* (2013.01)

(58) Field of Classification Search
CPC ............ B60G 17/0416; B60G 17/0565; B60G 2206/0112; B60G 2300/37; B60G 3/14;
(Continued)

(56) References Cited

U.S. PATENT DOCUMENTS

| | | | |
|---|---|---|---|
| 4,770,430 A | * | 9/1988 | Lange ................... B62D 13/06 |
| | | | 280/81.5 |
| 4,881,747 A | * | 11/1989 | Raidel ................... B60G 11/27 |
| | | | 280/81.6 |

(Continued)

FOREIGN PATENT DOCUMENTS

| | | | | |
|---|---|---|---|---|
| CN | 109624639 A | * | 4/2019 | |
| DE | 202005020640 U1 | * | 6/2006 | ............... B60G 3/14 |

(Continued)

OTHER PUBLICATIONS

Machine translation of EP1318066B1 obtained from espacenet.com on May 26, 2021.*

(Continued)

*Primary Examiner* — Laura Freedman
(74) *Attorney, Agent, or Firm* — Kilpatrick Townsend & Stockton LLP (57) ABSTRACT

The invention relates to an axle assembly and a heavy-duty vehicle having such an axle assembly, which comprises a pivot bearing having a substantially vertically extending steering axis of rotation, a bogie rotatably arranged about the steering axis of rotation, a rocker mounted on the bogie so as to be pivotable about a substantially horizontal pivot axis, a wheel carrier operatively connected to the rocker having at least one wheel rotatably mounted thereon about a wheel axis of rotation, the wheel axis of rotation extending substantially horizontally and, when driving straight ahead, substantially transversely to the direction of travel, and a pneumatically actuatable power device, which is arranged between the rocker and the bogie.

17 Claims, 3 Drawing Sheets

(58) Field of Classification Search
CPC ........ B60G 21/007; B60G 11/27; B60G 9/02;
B62D 61/12; B62D 53/068; B60B 35/004
USPC ........................................................ 280/86.5
See application file for complete search history.

(56) References Cited

U.S. PATENT DOCUMENTS

| | | | | |
|---|---|---|---|---|
| 2015/0352921 | A1* | 12/2015 | Dames | B60G 17/08 280/5.514 |
| 2020/0384819 | A1* | 12/2020 | Maier | B60G 3/14 |

FOREIGN PATENT DOCUMENTS

| | | | |
|---|---|---|---|
| DE | 102010060274 | A1 | 5/2012 |
| DE | 102012205641 | A1 | 10/2013 |
| DE | 202016105189 | U1 | 10/2016 |
| DE | 102017207803 | A1 * | 11/2018 ............... F16C 11/04 |
| DE | 102017207803 | A1 | 11/2018 |
| DE | 102017212127 | A1 | 1/2019 |
| EP | 1318066 | B1 * | 7/2006 ........... B62D 53/068 |
| KR | 102237177 | B1 * | 4/2021 ............... B60G 3/20 |
| WO | WO-9205970 | A1 * | 4/1992 ............ B60G 5/047 |
| WO | WO-2019192648 | A1 * | 10/2019 ............. F16C 19/16 |

OTHER PUBLICATIONS

German Application No. 10 2019 203 018.1, German Search Report dated Jan. 3, 2020, 6 pages.
Standard 2007/46 / EC Sep. 5, 2007, "Establishing a Framework for the Approval of Motor Vehicles and Their Trailers as Well as Systems, Components and Independent Technical Units for These Vehicles", Directive 2007/46/EC of Sep. 5, 2007, ISSN 1725-2539, pp. 1-160.

* cited by examiner

AXLE ASSEMBLY FOR A HEAVY-DUTY VEHICLE AND HEAVY DUTY-VEHICLE HAVING AT LEAST ONE SUCH AXLE ASSEMBLY

CROSS REFERENCE TO RELATED APPLICATION

This application claims priority to German Patent Application No. 10 2019 203 018.1, filed in Germany on Mar. 6, 2019, the entire contents of which are hereby incorporated herein by this reference.

BACKGROUND

In the past, particularly in the field of heavy-duty applications, axle assemblies having hydraulically operated axle compensation systems have been used as a rule to implement a corresponding axle compensation, which axle assemblies comprise one or a plurality of pressurized hydraulic circuits and are operated with an operating fluid, such as hydraulic oil. In the case of a generic axle assembly, the pivot angle of the rocker, which is mounted on the bogie so as to be pivotable about a substantially horizontally extending pivot axis, may accordingly be changed in such a way that, for example, the loading height of the heavy-duty vehicle desired for the respective scenario is achieved. With such hydraulically actuated axle compensation systems, the highest degree of tightness of the hydraulics in question or of the respective hydraulic circuit with its associated components must constantly be ensured, inter alia, since an uncontrolled escape of hydraulic oil into the surroundings may invariably result in potentially adverse effects on the environment or potential dangers for other road users on public roads. Due to its aging behavior, the hydraulic oil used must also be replaced regularly as part of maintenance procedures. In addition, such hydraulically adjustable axle assemblies or heavy-duty vehicles having such axle assemblies have correspondingly high dead weights, inter alia, due to the hydraulic components required for this, which must frequently be designed for operating pressures of up to 250 bar, which conflicts with the demand for maximized use of the payload placed on heavy-duty vehicles used for commercial purposes, given a specified permissible axle load and/or specified permissible total weight of the heavy-duty vehicle, depending on the number of axle assemblies. As part of the dynamic vehicle design, it should also be noted that spring-damper units of hydraulically adjustable axle assemblies, when they are empty for example, must generally be provided with an additional nitrogen cushion in order to achieve safe driving behavior, which results in a correspondingly complex construction and thus, potentially, in increased costs. Finally, the use of hydraulically adjustable axle assemblies generally results in high stress on the roads or bridges traversed by these assemblies, which may have undesirable consequences, particularly on public roads having a high volume of traffic.

SUMMARY

According to certain embodiments, an axle assembly is designed for use in a heavy-duty vehicle. The axle assembly comprises a pivot bearing having a substantially vertically extending steering axis of rotation, a bogie rotatably arranged about the steering axis of rotation, a rocker mounted on the bogie so as to be pivotable about a substantially horizontally extending pivot axis, and a wheel carrier operatively connected to the rocker having at least one wheel rotatably mounted thereon about a wheel axis of rotation, the wheel axis of rotation extending substantially horizontally and, when driving straight ahead, substantially transversely to the direction of travel. In some embodiments, a heavy-duty vehicle has at least one axle assembly of this type.

These illustrative embodiments are mentioned not to limit or define the disclosure, but to provide examples to aid understanding thereof. Additional embodiments are discussed in the Description, and further description is provided there.

BRIEF DESCRIPTION OF THE DRAWINGS

Features, embodiments, and advantages of the present disclosure are better understood when the following Description is read with reference to the accompanying drawings, where.

The invention relates to an axle assembly which is designed and intended to be used in a heavy-duty vehicle, the axle assembly comprising a pivot bearing having a substantially vertically extending steering axis of rotation, a bogie rotatably arranged about the steering axis of rotation, a rocker mounted on the bogie so as to be pivotable about a substantially horizontally extending pivot axis, and a wheel carrier operatively connected to the rocker having at least one wheel rotatably mounted thereon about a wheel axis of rotation, the wheel axis of rotation extending substantially horizontally and, when driving straight ahead, substantially transversely to the direction of travel.

The invention further relates to a heavy-duty vehicle having at least one axle assembly of this type.

At this point, it should be noted that the heavy-duty vehicle for which the axle assembly according to the invention is to be designed may be both a motor-driven heavy-duty vehicle and a towed heavy-duty vehicle, for example, a heavy-duty trailer or, as it is called in Annex XI to EC Directive 2007-46-EC in the version dated 15 Jul. 2011, a "trailer for heavy goods transport", i.e. according to the definition of this term given there, a vehicle of class O4 for transporting separable and inseparable loads (for example, construction machines, containers and rotor blades of wind turbines) which, due to their dimensions, are subject to speed and traffic restrictions, modular trailers, regardless of the number of axles and modules also being included. It should also be noted that even in the case of motor-driven heavy-duty vehicles, not all of the axle assemblies need to be motor-driven.

In addition, only those vehicles are regarded as heavy-duty vehicles within the meaning of the present invention in which the load for which each individual axle assembly has to be designed has a value of at least 4 t, preferably at least 5 t, more preferably at least 6 t.

Depending on the particular load to be transported, such heavy-duty vehicles often have a large number of axle assemblies which may be designed at least in part as steerable axle assemblies. In addition, the axle assemblies of such heavy-duty vehicles often exhibit an axle compensation, which may also be referred to as "level regulation", in order for a loading surface of the heavy-duty vehicle, which is designed to hold a load to be transported, to be maintained in a horizontal state, or to be lowered, raised and/or, if required, inclined for loading and unloading. During a transport operation, for example, it may also be necessary to regulate the loading height, i.e. the height of a loading surface of the heavy-duty vehicle relative to a wheel contact plane of the axle assembly of the heavy-duty vehicle, in order to comply with certain legal regulations or to be able to overcome or to pass an obstacle on a transport route. In this way, for example, passage through a tunnel having a limited overall height or other similar scenarios may be taken into account.

In the past, particularly in the field of heavy-duty applications, axle assemblies having hydraulically operated axle compensation systems have been used as a rule to implement a corresponding axle compensation, which axle assemblies comprise one or a plurality of pressurised hydraulic circuits and are operated with an operating fluid, such as hydraulic oil. In the case of a generic axle assembly, the pivot angle of the rocker, which is mounted on the bogie so as to be pivotable about a substantially horizontally extending pivot axis, may accordingly be changed in such a way that, for example, the loading height of the heavy-duty vehicle desired for the respective scenario is achieved. With such hydraulically actuated axle compensation systems, the highest degree of tightness of the hydraulics in question or of the respective hydraulic circuit with its associated components must constantly be ensured, inter alia, since an uncontrolled escape of hydraulic oil into the surroundings may invariably result in potentially adverse effects on the environment or potential dangers for other road users on public roads. Due to its aging behaviour, the hydraulic oil used must also be replaced regularly as part of maintenance procedures.

In addition, such hydraulically adjustable axle assemblies or heavy-duty vehicles having such axle assemblies have correspondingly high dead weights, inter alia, due to the hydraulic components required for this, which must frequently be designed for operating pressures of up to 250 bar, which conflicts with the demand for maximised use of the payload placed on heavy-duty vehicles used for commercial purposes, given a specified permissible axle load and/or specified permissible total weight of the heavy-duty vehicle, depending on the number of axle assemblies.

As part of the dynamic vehicle design, it should also be noted that spring-damper units of hydraulically adjustable axle assemblies, when they are empty for example, must generally be provided with an additional nitrogen cushion in order to achieve safe driving behaviour, which results in a correspondingly complex construction and thus, potentially, in increased costs.

Finally, the use of hydraulically adjustable axle assemblies generally results in high stress on the roads or bridges traversed by these assemblies, which may have undesirable consequences, particularly on public roads having a high volume of traffic.

It is therefore an object of the invention to provide an axle assembly which is improved in this regard or a heavy-duty vehicle which is improved in this regard.

According to a first aspect of the invention, this object is achieved by an axle assembly which is designed and intended to be used in a heavy-duty vehicle, the axle assembly comprising a pivot bearing having a substantially vertically extending steering axis of rotation, a bogie rotatably arranged about the steering axis of rotation, a rocker mounted on the bogie so as to be pivotable about a substantially horizontally extending pivot axis, a wheel carrier operatively connected to the rocker having at least one wheel rotatably mounted thereon about a wheel rotation axis, the wheel axis of rotation extending substantially horizontally and, when driving straight ahead, substantially transversely to the direction of travel, and a pneumatically actuatable power device which is supported at one end on the bogie or on a part connected thereto and at the other end on the rocker or on a part connected thereto.

The provision of a pneumatically actuatable power device on the axle assembly according to the invention, which may preferably be operated with compressed air or with another suitable gaseous pressure medium, has the particular advantage that a leak in the pneumatically actuatable power device generally results in no adverse effects on the environment nor in potential risks to other road users since, in the event of malfunction, only the gaseous medium is able to escape into the surroundings. In addition, the axle assembly according to the invention has a reduced maintenance requirement, and thus reduced maintenance costs, compared to known hydraulic axle assemblies, since no regular replacement of operating fluid is required.

If the axle assembly according to the invention is operated with air, it is self-evident that this is generally available as an operating medium in virtually unlimited quantities and free of charge. In addition, no return lines need to be provided in this case to a storage for excess air supplied to the pneumatically actuatable power device, since the air may be released directly into the surroundings if necessary.

It is also apparent to the person skilled in the art that the axle assembly according to the invention generally has a reduced dead weight compared to hydraulically actuated axle assemblies due to its pneumatic actuation. The latter is attributable, inter alia, to the significantly lower operating pressures compared to hydraulic systems, and thus to the fact that the components are less massive. In this way, it is possible to achieve an increased payload and thus significant economic advantages with a specified permissible total weight of the heavy-duty trailer. The axle assembly according to the invention also has particularly road and bridge-protective properties.

Due to the fact that the pneumatically actuatable power device according to the invention is supported at one end on the bogie or on a part connected thereto and at the other end on the rocker or on a part connected to thereto, it is possible to implement an installation space concept in which a high maximum steering angle about the substantially vertically extending steering axis of rotation of the pivot bearing is achievable, even given relatively large dimensions of the pneumatically actuatable power device. Such an arrangement of the pneumatically actuatable power device does not therefore result in any significant restriction of the movement of the axle assembly about the steering axis of rotation, since the power device is always able to rotate with the bogie or the rocker and is not, for example, permanently connected at one end to a frame or to a part of a heavy-duty vehicle connected thereto, as may be the case, for example, with steering-knuckle-guided axle assemblies. In this case, the maximum steering angle of the axle assembly according to the invention may be at least ±35°, preferably at least ±45°. Such a large maximum steering angle generally results in reduced tyre wear and in additional protection of the road surface, which provides both environmentally-friendly and economic advantages.

In order to be able to ensure an advantageous load distribution on preferably all wheels of the axle assembly, even when driving through uneven terrain, it is proposed according to a preferred embodiment of the axle assembly according to the invention that the wheel carrier is pivotably attached on the rocker, preferably pivotally about a pivot axis extending essentially parallel to the longitudinal direction of the rocker. This embodiment of the invention may, for example, be a so-called "pendulum-axis axle assembly". A pivot angle produced by a pivoting movement of the wheel carrier on the rocker, which may also be referred to as a "pendulum angle", may in this case be at least ±8°, preferably at least ±15°.

In general, the axle assembly according to the invention may be designed as a friction-steered axle assembly. If, however, the axle assembly is intended for an application in which positive steering thereof is preferred, the bogie may further comprise a steering lever assigned thereto, which is arranged and intended for the purpose of steering the axle assembly, to exert a steering force on the bogie, which rotates said bogie about the steering axis of rotation. At this point, it is noted merely for the sake of completeness that it is entirely conceivable to provide both friction-steered and positively-steered axle assemblies of this type on one and the same heavy-duty vehicle.

In principle, it would be conceivable to design the pneumatically actuatable power device as a pneumatic cylinder having a cylinder-piston arrangement. According to a particularly lightweight and at the same time cost-efficient embodiment of the axle assembly according to the invention, it is proposed that the pneumatically actuatable power device is designed as a pneumatic bellows. The pneumatic bellows in this case may be supplied with compressed air preferably from a compressed air generating device assigned to the axle assembly, so that a corresponding pivot angle is set between the rocker and the bogie as a function of an operating pressure of the pneumatic bellows and of the load acting on the axle assembly.

According to a first alternative embodiment, the wheel carrier may be arranged on a free end of the rocker, which is provided opposite to an end of the rocker pivotably connected to the bogie, the pneumatically actuatable power device being arranged preferably in front of the steering axis of rotation of the pivot bearing relative to the forward direction of travel. In principle, it is possible in this way to achieve a compact and assembly-friendly design of the axle assembly according to the invention, with which a considerable adjustment range of the resultant pivot angle between the rocker and the bogie and thus, if necessary, a loading height of a heavy-duty vehicle having such an axle assembly may also be achieved.

In order to be able to provide increased design freedom for the design of the pneumatically actuatable power device, it is proposed according to one refinement of the first alternative embodiment that the end of the pneumatically actuatable power device assigned to the rocker is supported on a reversing lever connected to the rocker in an operatively fixed manner and protruding preferably substantially orthogonally therefrom. In this way, an installation space conflict arising between the wheel rotatably mounted on the wheel carrier and the pneumatically actuatable power device may be specifically avoided.

If an axle assembly according to the invention in accordance with the first alternative embodiment is also a pendulum-axis axle assembly as explained above, the wheel carrier may then comprise a bearing unit which comprises bearing rings integrally formed in a circumferential direction of the bearing unit and which are adapted for an axial bearing assembly on the rocker. According to this embodiment of the present invention, a particularly simple assembly of the wheel carrier is thus made possible by the wheel carrier, together with its associated bearing unit, being able to be mounted on the rocker, preferably in the assembled state.

According to a second alternative embodiment, the wheel carrier may be arranged on a portion of the rocker located between a free end of the rocker and the end thereof pivotably connected to the bogie, and the pneumatically actuatable power device may be supported on the free end of the rocker or on the rocker adjacent to this free end, the pneumatically actuatable power device being arranged preferably behind the steering axis of rotation of the pivot bearing relative to the forward direction of travel. In this case, due to the increased distance between the force application location of the pneumatically actuatable power device and the rocker relative to the end of the rocker connected to the bogie, a particularly favourable leverage effect results, so that the pneumatically operated power device is operable with comparatively lower forces as compared to the axle assembly according to the first alternative embodiment, in order to achieve a torque that supports the rocker and the wheel carrier.

If an axle assembly according to the invention in accordance with the second alternative embodiment is also a pendulum-axis axle assembly as explained above, the wheel carrier, to ensure an assembly suitable for manufacture, may then comprise a bearing unit, which comprises bearing rings which are separable in a circumferential direction of the bearing unit, and which are adapted for a radial bearing assembly on the rocker.

In order to also allow proper operation of the axle assembly according to the invention even under the heaviest loads, the pneumatically actuatable power device may have an operating pressure of no more than 16 bar, preferably of no more than 8.5 bar, more preferably of no more than 4 bar. If an operating pressure of no more than 16 bar is to be provided, a pressure generating device supplying this operating pressure may then also be provided on the heavy-duty vehicle according to the invention. If, however, the operating pressure is only no more than 8.5 bar, it is conceivable, for example, to supply this operating pressure in a simple manner from a towing vehicle assigned to the heavy-duty vehicle. At an operating pressure of only no more than 4 bar, a particularly cost-efficiently designed, pneumatically actuatable power device may also be used.

In order for the axle assembly according to the invention to also allow a satisfactory adjustment of the loading height, whether for a loading operation or an unloading operation, for overcoming obstacles on a transport route or for complying with legal regulations, the axle assembly may also have a working stroke of at least 180 mm, preferably of at least 400 mm, more preferably of at least 600 mm. The working stroke in this case may be defined by a maximum amount of a possible displacement of the wheel, in particular the wheel centre, relative to the bogie caused by a pivoting movement of the rocker relative to the pivot bearing.

In order to ensure roadworthy driving behaviour and to avoid excessive swinging of the axle assembly occurring during the journey, it is also conceivable in one refinement of the invention that the axle assembly further comprises at least one damping device that dampens the pivoting movement between the rocker and the bogie. This damping device may be designed, for example, as a cylinder-piston arrangement, one end of the cylinder-piston arrangement being rotatably connected to the rocker and the other end of the cylinder-piston arrangement being rotatably connected to the bogie. In this case, for example, a commercially available hydraulic damper suitable for heavy load applications may be provided.

In order to initiate a correct deceleration force, the axle assembly may finally also comprise a brake cylinder which is connected to a braking device accommodated preferably in the wheel carrier.

Finally, according to another embodiment of the invention, the wheel carrier may have two opposite ends with respect to the rocker, at each of which a wheel rotatably mounted about the wheel axis of rotation is attached. This may not only serve to better distribute the load acting on the wheel carrier, but also contribute to an increase in the maximum permissible axle load of the axle assembly, which is determined according to some national regulations by the number of wheel tracks of an axle assembly or of an axle line of a heavy-duty vehicle.

As previously mentioned at the outset, the invention also relates, according to a further aspect, to a heavy-duty vehicle having at least one axle assembly according to any of the preceding claims. With regard to the advantages of said heavy-duty vehicle, reference is made to the preceding discussion of the axle assembly according to the invention.

Figure 1A:
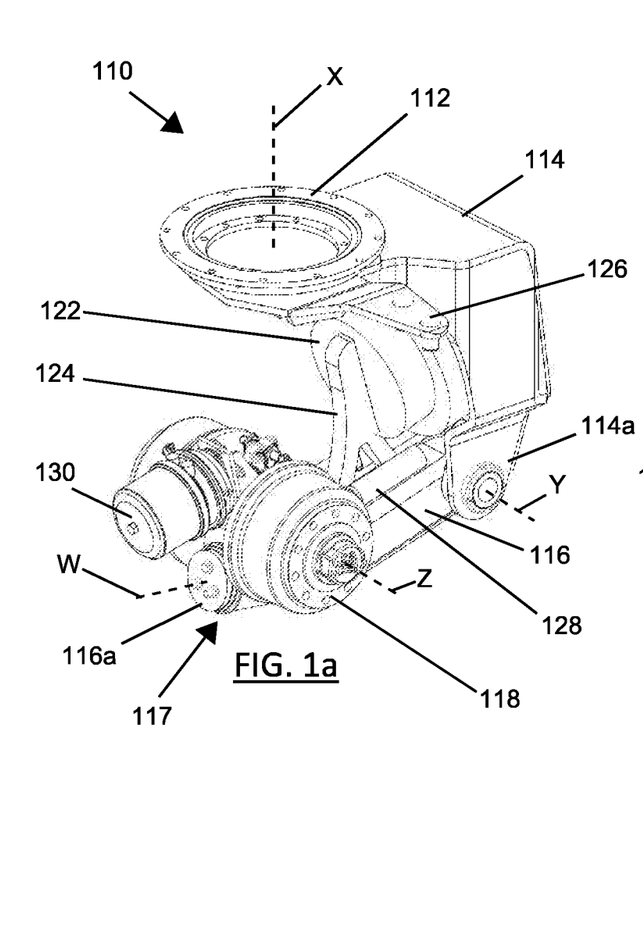
FIG. 1a is an isometric view of a first exemplary embodiment of an axle assembly designed as a pendulum-axis axle assembly, according to certain embodiments.
Figure 1B:
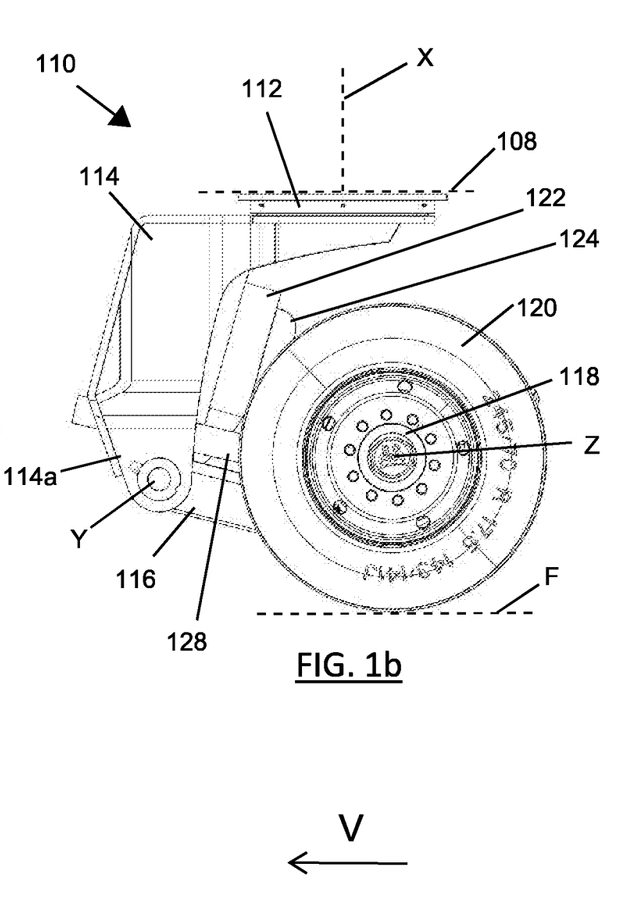
FIG. 1b is a side view of the first exemplary embodiment of the axle assembly designed as a pendulum-axis axle assembly, according to certain embodiments.
Figure 2A:
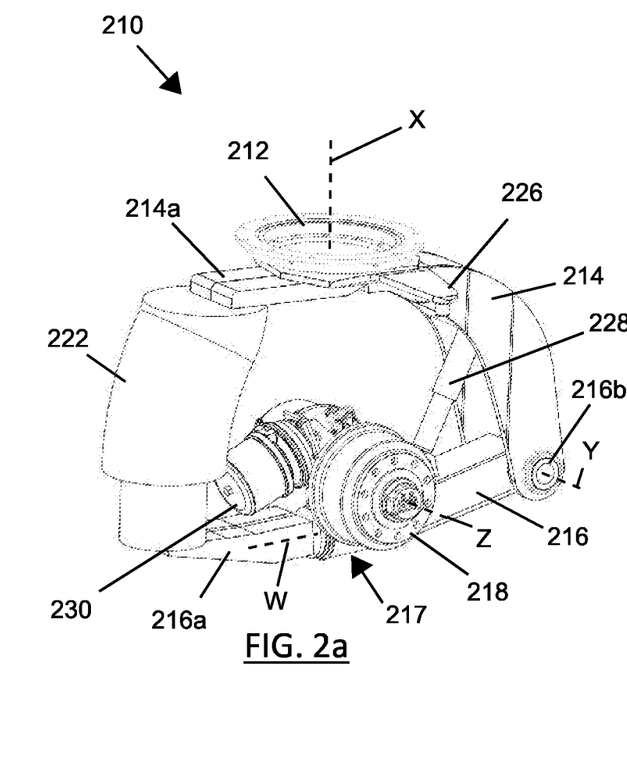
FIG. 2a is an isometric view of a second exemplary embodiment of an axle assembly designed as a pendulum-axis axle assembly, according to certain embodiments.
Figure 2B:
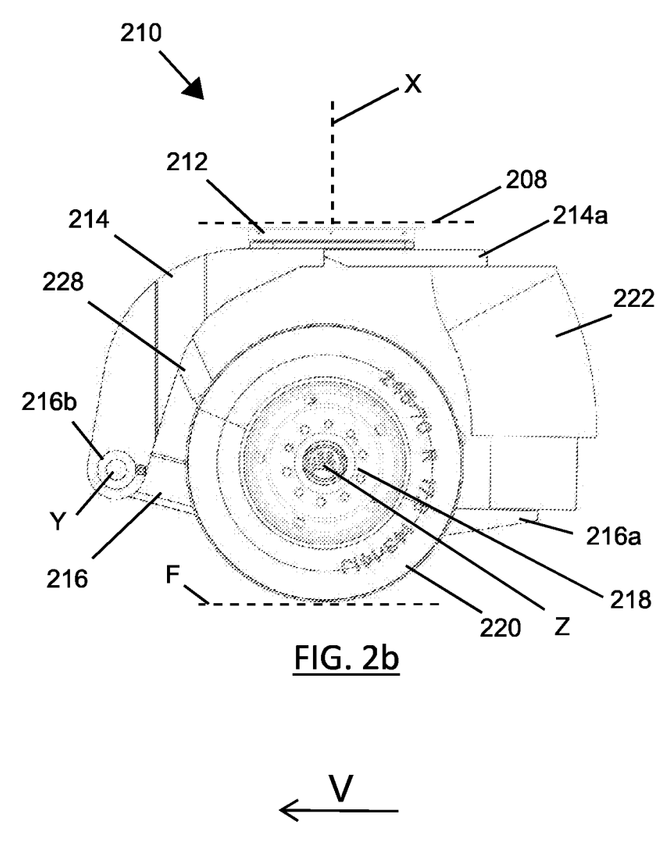
FIG. 2b is a side view of the second exemplary embodiment of the axle assembly designed as a pendulum-axis axle assembly, according to certain embodiments.
Figure 3:
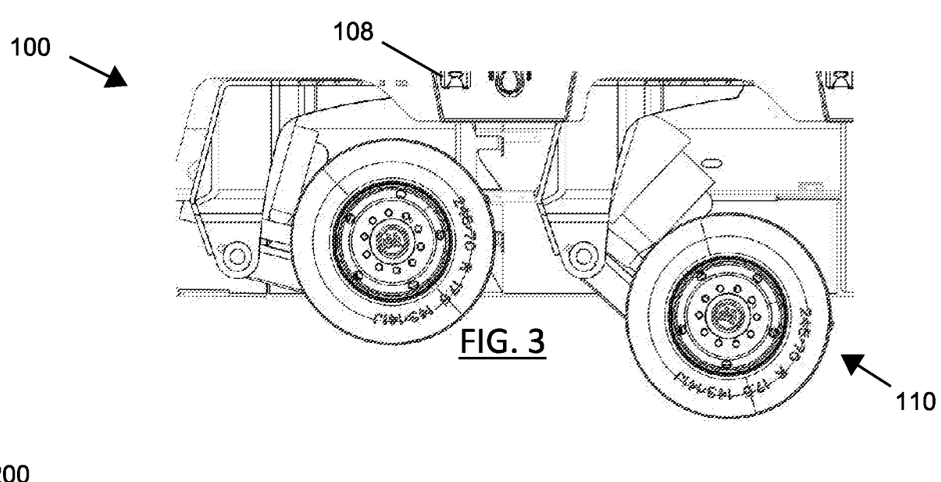
FIG. 3 is a partial view of a heavy-duty vehicle according to the invention having axle assemblies according to the invention in accordance with the first exemplary embodiment.
Figure 4:
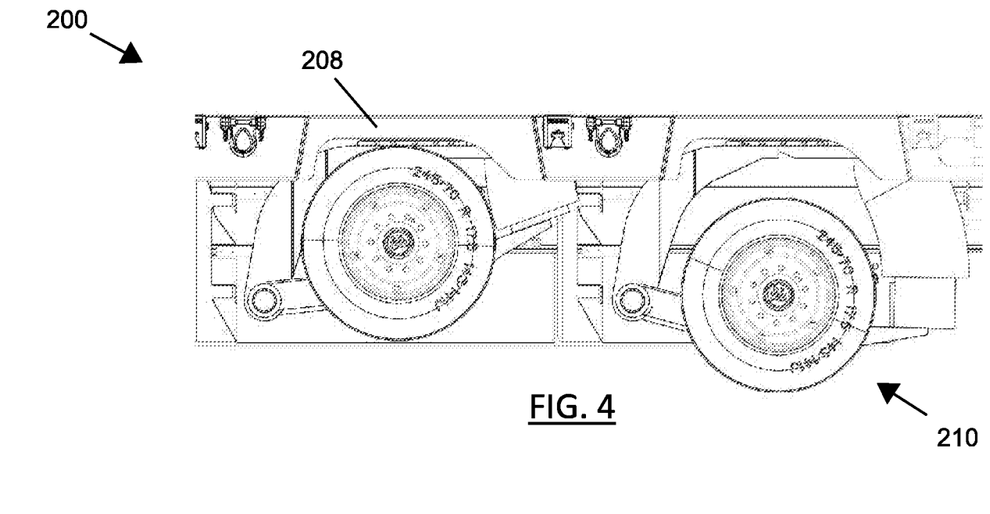
FIG. 4 is a partial view of a heavy-duty vehicle according to the invention having axle assemblies according to the invention in accordance with the second exemplary embodiment.

The invention will be explained in greater detail below with reference to the attached drawings based on some exemplary embodiments. In the drawings:

FIGS. 1a and 1b are an isometric and a side view of a first exemplary embodiment of an axle assembly according to the invention, which is designed as a pendulum-axis axle assembly;

FIGS. 2a and 2b are an isometric and a side view of a second exemplary embodiment of an axle assembly according to the invention, which is designed as a pendulum-axis axle assembly;

FIG. 3 is a partial view of a heavy-duty vehicle according to the invention having axle assemblies according to the invention in accordance with the first exemplary embodiment; and FIG. 4 is a partial view of a heavy-duty vehicle according to the invention having axle assemblies according to the invention in accordance with the second exemplary embodiment.

Referring to FIGS. 1a and 1b, the axle assembly 110, which is designed by way of example as a pendulum-axis axle assembly, comprises a pivot bearing 112 having a substantially vertically extending steering axis of rotation X, a bogie 114 fixedly connected to the pivot bearing 112, and a rocker 116 pivotably arranged at the free end 114a thereof about a substantially horizontally extending pivot axis Y, and a wheel carrier 118, which is pivotably arranged at the free end 116a of the rocker 116 about a pivot axis W. In order to implement this arrangement, which may be pivoted about the pivot axis W, the wheel carrier 118 comprises a bearing unit 117 which comprises bearing rings integrally formed in a circumferential direction of the bearing unit 117, and which are adapted for an axial bearing assembly extending substantially parallel to the pivot axis W. In addition, the wheel carrier 118 comprises wheels 120 which are rotatably mounted about a wheel axis of rotation Z, the wheels 120 being depicted only in FIG. 1b and having been omitted in FIG. 1a purely for reasons of clarity. A pneumatic bellows 122 is also provided, which acts between the bogie 114 and the rocker 116 and which may be pneumatically actuated or pressurised with compressed air, preferably by a compressed air generating device (not shown), and which is supported at one end on the bogie 114 and at the other end on a reversing lever 124 connected to the rocker 116 in an operationally fixed manner, the reversing lever protruding substantially orthogonally from the rocker 116 so that a pivot angle occurring between the rocker 116 and the bogie 114 may be influenced. The pneumatic bellows 122 in this case is arranged in a forward direction V of the axle assembly 110 in front of the steering axis of rotation X of the pivot bearing 112.

Referring to FIG. 3, which is a partial view of a heavy-duty vehicle 100 according to the invention having axle assemblies 110 according to the invention, the wheels 120 may thus be adjusted at different distances relative to a frame 108 of the heavy-duty vehicle 100. Said frame 108 is also indicated schematically in FIG. 1b. Thus, it is possible, for example, to set a desired loading height of the heavy-duty vehicle 100 and/or to compensate for unevenness in a roadway F schematically indicated in FIG. 1b.

As is also apparent in FIG. 1a, the axial group 110 further comprises a steering lever 126 assigned to the bogie 114, which is arranged and intended for the purpose of exerting a steering force on the bogie 114 to rotate the bogie 114 about the steering axis of rotation X. The steering lever 126 in this case may be connected to a steering force generating device, not shown in FIG. 1a. In addition, a damping device 128 is arranged between the rocker 116 and the bogie 114, which in the exemplary embodiment shown is designed as two cylinder-piston assemblies 128, in order to dampen a pivoting movement between the rocker 116 and the bogie 114 in such a way that a safe driving behaviour of the axle assembly 110 or the heavy-duty vehicle 100 may be ensured. One end of the cylinder-piston arrangement 128 is in this case rotatably connected to the rocker 116 and the respective other end of the cylinder-piston arrangement 128 is rotatably connected to the bogie 114. Finally, the wheel carrier 118 also comprises a brake cylinder 130, which is connected to a braking device, not shown in further detail in FIG. 1a, and is accommodated in the wheel carrier 118 in such a way that it is able to slow a rotary movement of the wheel carrier about the Z axis.

FIGS. 2a and 2b and FIG. 4 show another embodiment of an axle assembly 210 according to the invention and a heavy-duty vehicle 200 according to the invention, respectively. The axle assembly 210 is also designed as a pendulum-axis axle assembly. Analogous parts therein are provided with the same reference numerals as in FIGS. 1a and 1b, but augmented by the number 100. In addition, the embodiment in FIGS. 2a and 2b will be described below only insofar as it differs from the embodiment in FIGS. 1a and 1b, the description of which is otherwise expressly referred to here.

As can be seen in FIG. 2a, the wheel carrier 218 of the axle assembly 210 is arranged on a portion of the rocker 216 that is located between the free end 216a of the rocker 216 and the end 216b thereof pivotably connected to the bogie 214. According to the depicted second exemplary embodiment of the axle assembly 210 according to the invention, the pneumatic bellows 222 is supported on the free end 216a of the rocker 216 and on an end 214a of the bogie 214 opposite thereof, and is situated behind the steering axis of rotation X of the pivot bearing 212 relative to the forward direction of travel V of the axle assembly 210. Because of the arrangement of the pneumatic bellows 222 explained above, the bogie 214 according to the second exemplary embodiment may be narrower in design than the bogie 114, preferably in an extension direction that runs substantially parallel to the pivot axis Y, since no additional installation space need be provided for accommodating the pneumatic bellows 222 within a portion of the bogie 214 arranged in the forward direction V in front of the steering axis X.

Referring to FIG. 4 which, similar to FIG. 3, is a partial view of a heavy-duty vehicle 200 according to the invention having axle assemblies 210 according to the invention, the wheels 220 may thus be adjusted in a similar manner at different distances relative to the frame 208 of the heavy-duty vehicle 200, and unevenness of the roadway F may be compensated for accordingly.

To allow a pivoting movement of the wheel carrier 218 depicted in FIGS. 2a and 2b about the pivot axis W, the wheel carrier 218 comprises a bearing unit 217, which comprises bearing rings that are separable in a circumferential direction of the bearing unit 217 and which are adapted for a radial bearing assembly on the rocker 216 relative to the pivot axis W. As an alternative to the embodiment depicted in FIGS. 2a and 2b, however, it may conversely also be provided that the rocker is formed in two parts and accordingly the bearing unit comprises bearing rings integrally formed in the circumferential direction so that, for example, the bearing unit may in turn be mounted in a direction running substantially parallel to the pivot axis W on a first part of the rocker, preferably a part pivotally connected to the bogie 214, and the respective other part of the rocker may be subsequently or simultaneously mounted on the opposite side of the bearing unit.

Finally, the axle assembly 210 also comprises the damping device 228 which, in contrast to the axle assembly 110 according to the first embodiment of the invention, is designed as a single cylinder-piston arrangement 228.

The invention claimed is:

1. An axle assembly which is designed and intended to be used in a heavy-duty vehicle, the axle assembly comprising:
   a pivot bearing having a substantially vertically extending steering axis of rotation;
   a bogie rotatably arranged about the steering axis of rotation;
   a rocker mounted on the bogie so as to be pivotable about a substantially horizontally extending pivot axis;
   a wheel carrier operatively connected to the rocker having at least one wheel rotatably mounted thereon about a wheel axis of rotation, the wheel axis of rotation extending substantially horizontally and, when driving straight ahead, substantially transversely to a direction of travel, the wheel carrier being arranged on a portion of the rocker which is located between a free end of the rocker and an additional end of the rocker that is pivotably connected to the bogie; and
   a pneumatically actuatable power device, which is supported, at a first end of the pneumatically actuatable power device, on the bogie or on a part connected thereto and, at a second end of the pneumatically actuatable power device, on or adjacent to the free end of the rocker, wherein the pneumatically actuatable power device is arranged behind the steering axis of rotation of the pivot bearing relative to a forward direction of travel.

2. The axle assembly according to claim 1, wherein the wheel carrier is pivotably attached to the rocker about a pivot axis, the pivot axis extending substantially parallel to a longitudinal extension direction of the rocker.

3. The axle assembly according to claim 1, wherein the bogie comprises a steering lever assigned thereto, which is arranged for steering the axle assembly to exert a steering force on the bogie, which rotates said bogie about the steering axis of rotation.

4. The axle assembly according to claim 1, wherein the pneumatically actuatable power device is designed as a pneumatic bellows.

5. The axle assembly according to claim 1, wherein the wheel carrier comprises a bearing unit, which comprises bearing rings integrally formed in a circumferential direction of the bearing unit, and which are adapted for an axial bearing mounting on the rocker.

6. The axle assembly according to claim 1, wherein the wheel carrier comprises a bearing unit, which comprises bearing rings which are separable in a circumferential direction of the bearing unit and which are adapted for a radial bearing assembly on the rocker.

7. The axle assembly according to claim 1, wherein the pneumatically actuatable power device has an operating pressure of no more than 16 bar.

8. The axle assembly according to claim 1, further comprising at least one damping device, which dampens a pivoting movement between the rocker and the bogie.

9. The axle assembly according to claim 8, wherein the damping device is designed as a cylinder-piston arrangement, wherein a first end of the cylinder-piston arrangement is rotatably connected to the rocker and a second end of the cylinder-piston arrangement is rotatably connected to the bogie.

10. The axle assembly according to claim 1, further comprising a brake cylinder, which is connected to a braking device accommodated in the wheel carrier.

11. The axle assembly according to claim 1, wherein the wheel carrier has two opposite ends with respect to the rocker, at each of which a particular wheel of the at least one wheel rotatably mounted about the wheel axis of rotation is attached.

12. The axle assembly according to claim 1, wherein the axle assembly has a working stroke of at least 180 mm.

13. A heavy-duty vehicle having at least one axle assembly, wherein the at least one axle assembly comprises:
   a pivot bearing having a substantially vertically extending steering axis of rotation;
   a bogie rotatably arranged about the steering axis of rotation;
   a rocker mounted on the bogie so as to be pivotable about a substantially horizontally extending pivot axis;
   a wheel carrier operatively connected to the rocker having at least one wheel rotatably mounted thereon about a wheel axis of rotation, the wheel axis of rotation extending substantially horizontally and, when driving the heavy-duty vehicle straight ahead, substantially transversely to a direction of travel of the heavy-duty vehicle, the wheel carrier being arranged on a portion of the rocker which is located between a free end of the rocker and an additional end of the rocker that is pivotably connected to the bogie; and
   a pneumatically actuatable power device, which is supported, at a first end of the pneumatically actuatable power device, on the bogie or on a part connected thereto and, at a second end of the pneumatically actuatable power device, on or adjacent to the free end of the rocker, wherein the pneumatically actuatable power device is arranged behind the steering axis of rotation of the pivot bearing relative to a forward direction of travel.

14. An axle assembly which is designed and intended to be used in a heavy-duty vehicle, the axle assembly comprising:
- a pivot bearing having a substantially vertically extending steering axis of rotation;
- a bogie rotatably arranged about the steering axis of rotation;
- a rocker mounted on the bogie so as to be pivotable about a substantially horizontally extending pivot axis;
- a wheel carrier operatively connected to the rocker having at least one wheel rotatably mounted thereon about a wheel axis of rotation, the wheel axis of rotation extending substantially horizontally and, when driving straight ahead, substantially transversely to a direction of travel; and
- a pneumatically actuatable power device, which is supported, at a first end of the pneumatically actuatable power device, on the bogie or on a part connected thereto and, at a second end of the pneumatically actuatable power device, on the rocker or on a part connected thereto, wherein the second end of the pneumatically actuatable power device is supported on a reversing lever, which is connected to the rocker in an operatively fixed manner and protrudes substantially orthogonally therefrom.

15. The axle assembly according to claim 14, further comprising at least one damping device designed as a cylinder-piston arrangement that dampens a pivoting movement between the rocker and the bogie, wherein a first end of the cylinder-piston arrangement is rotatably connected to the rocker and a second end of the cylinder-piston arrangement is rotatably connected to the bogie.

16. The axle assembly according to claim 14, wherein the wheel carrier is arranged at a free end of the rocker, which is provided opposite to an additional end of the rocker pivotably connected to the bogie, the pneumatically actuatable power device being arranged in front of the steering axis of rotation of the pivot bearing relative to the direction of travel.

17. An axle assembly which is designed and intended to be used in a heavy-duty vehicle, the axle assembly comprising:
- a pivot bearing having a substantially vertically extending steering axis of rotation;
- a bogie rotatably arranged about the steering axis of rotation;
- a rocker mounted on the bogie so as to be pivotable about a substantially horizontally extending pivot axis;
- a wheel carrier operatively connected to the rocker having at least one wheel rotatably mounted thereon about a wheel axis of rotation, the wheel axis of rotation extending substantially horizontally and, when driving straight ahead, substantially transversely to a direction of travel, wherein the wheel carrier comprises a bearing unit having bearing rings which are separable in a circumferential direction of the bearing unit and which are adapted for a radial bearing assembly on the rocker; and
- a pneumatically actuatable power device, which is supported, at a first end of the pneumatically actuatable power device, on the bogie or on a part connected thereto and, at a second end of the pneumatically actuatable power device, on the rocker or on a part connected thereto.

* * * * *